(12) United States Patent
Yamamoto et al.

(10) Patent No.: US 7,780,459 B2
(45) Date of Patent: Aug. 24, 2010

(54) ELECTRIC JUNCTION BOX

(75) Inventors: Masaki Yamamoto, Kakegawa (JP);
Edwin Martinez, Kakegawa (JP); John Paul De Jesus, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 152 days.

(21) Appl. No.: 12/233,109

(22) Filed: Sep. 18, 2008

(65) Prior Publication Data
US 2009/0071679 A1      Mar. 19, 2009

(30) Foreign Application Priority Data
Sep. 19, 2007     (JP) .............................. 2007-242298

(51) Int. Cl.
*H01R 12/00* (2006.01)
(52) U.S. Cl. .................. 439/76.2; 439/535; 439/456
(58) Field of Classification Search ............... 439/76.2, 439/449, 456, 535
See application file for complete search history.

(56) References Cited

U.S. PATENT DOCUMENTS

| | | | |
|---|---|---|---|
| 6,371,800 B1 * | 4/2002 | Kawaguchi | 439/535 |
| 6,570,088 B1 * | 5/2003 | Depp et al. | 174/50 |
| 6,848,916 B2 * | 2/2005 | Nakayama et al. | 439/76.2 |
| 7,422,443 B2 * | 9/2008 | Kaneko et al. | 439/76.2 |

* cited by examiner

*Primary Examiner*—Truc T Nguyen
(74) *Attorney, Agent, or Firm*—Sughrue Mion, PLLC

(57) ABSTRACT

An electric junction box has a binding band fitting hole, and two through holes through which a binding band for securing wire harnesses which are arranged along a lower face of a bottom wall of the binding band fitting hole are provided on the bottom wall so as to be positioned at both sides of the wire harnesses. When the wire harnesses are secured, a tip end of the binding band is inserted into one of the two through holes from a lower side of the bottom wall, the tip end of the binding band which has been exposed to an upper side of the bottom wall is U-turned in a downward direction to be inserted into the other of the two through holes, and then, the tip end of the binding band which has been exposed to the lower side of the bottom wall is locked to a lock part provided at a base end of the binding band, thereby to secure the wire harnesses to the lower face of the bottom wall. An upper face of a part of the bottom wall between the two through holes is formed as an arc-shaped wall which is curved upward in a convex shape, whereby a convex arc-shaped face and a concave arc-shaped face are formed on upper and lower faces of the bottom wall between the two through holes.

4 Claims, 6 Drawing Sheets

ELECTRIC JUNCTION BOX

BACKGROUND OF THE INVENTION

1. Field of the Invention

The present invention relates to an electric junction box (that is, an electric junction block) such as a relay box, a fuse box, an electronic control unit box, which is used in a vehicle such as an automobile.

2. Related Art

On occasion of securing a wire harness to an electric junction box, it has been often conducted that the wire harness is secured with a binding band (Reference should be made to JP-A-H09-51624). For example, in case of mounting a connector to the electric junction box, it has been conducted that the wire harness which has been withdrawn from the connector is secured to the electric junction box with the binding band. In this case, there has been such a structure that the binding band is integrally or separately provided with locking means such as a clip, and fixed to the electric junction box by the locking means. In an alternative structure, the binding band is fixed to the electric junction box by passing it in turn through two through holes which are provided on a wall of the electric junction box, and then, the binding band is closed thereby to secure the wire harness.

In the latter structure, a tip end of the binding band is passed through one of the through holes from a front side of the wall as a first step, then, the tip end of the binding band which has been exposed to the opposite side is U-turned to be passed through the other hole, and the tip end of the binding band which has been exposed to the front side is locked to a lock part which is provided at a base end of the binding band. Finally, the binding band is closed thereby to secure the wire harness.

By the way, in case where the two throughholes for passing the binding band as described above are provided on a bottom wall of an opening in the electric junction box, so that the wire harness which is arranged along a lower face of the bottom wall can be secured with the binding band from a lower side, it would be very difficult to pass the binding band through the two through holes by U-turning the binding band, in case where the aforesaid opening has a large depth. Therefore, the passing work must be done while groping by hand, and there has been a problem of bad workability.

SUMMARY OF THE INVENTION

The invention has been made in view of the above described circumstances, and it is an object of the invention to provide an electric junction box in which a tip end of a binding band can be easily passed through two through holes even in case of groping work by hand, thereby to facilitate securing work of a wire harness.

In order to attain the above described object, the electric junction box according to the invention is characterized in the following structures (1) to (4).

(1) An electric junction box comprising a binding band fitting hole, two through holes through which a binding band for securing a wire harness which is arranged along a lower face of a bottom wall of the binding band fitting hole being provided on the bottom wall so as to be positioned at both sides of the wire harness, wherein when the wire harness is secured, a tip end of the binding band is inserted into one of the two through holes from a lower side of the bottom wall, the tip end of the binding band which has been exposed to an upper side of the bottom wall is U-turned in a downward direction, and inserted into the other of the two through holes, and then, the tip end of the binding band which has been exposed to the lower side of the bottom wall is locked to a lock part provided at a base end of the binding band below the wire harness, thereby to secure the wire harness to the lower face of the bottom wall, characterized in that an upper face of the bottom wall between the two through holes is formed as a convex curved face which is curved in a convex shape in a direction substantially perpendicular to the bottom wall including the two through holes, whereby an inner side wall face of an upper inlet of at least the other of the two through holes is formed as an inclined guide face for guiding the tip end of the binding band into at least the other of the two through holes.

(2) An electric junction box having the structure as described above in (1), characterized in that the outer side wall face of the upper inlet of at least the other of the two through holes is formed as an inclined face for guiding the tip end of the binding band into at least the other of the two through holes.

(3) An electric junction box having the structure as described above in (1) or (2), characterized in that a lower face of the bottom wall between the two through holes is formed as a concave curved face which is curved in a concave shape in a direction substantially perpendicular to the bottom wall including the two through holes.

(4) An electric junction box as described above in (3), characterized in that the bottom wall between the two through holes is formed as an arc-shaped wall which is curved in a convex shape upward in a direction substantially perpendicular to the bottom wall including the two through holes, whereby the upper face of the bottom wall between the two through holes is formed as a convex arc-shaped face and the lower face of the bottom wall between the two through holes is formed as a concave arc-shaped face.

According to the electric junction box having the structure as described above in (1), the following advantage can be achieved. In case where the wire harness which is arranged along the lower face of the bottom wall of the binding band fitting hole is secured to the bottom wall, as a first step, the tip end of the binding band is inserted into one of the two through holes from the lower side of the bottom wall, and thereafter, the tip end of the binding band which has been exposed to the upper side of the bottom wall is U-turned in a downward direction, and inserted into the other of the two through holes. On this occasion, the upper face of the bottom wall between the two throughholes is formed as the convex curved face, whereby the inner side wall face of the upper inlet of at least the other of the two through holes is formed as the inclined guide face. Therefore, owing to guiding action of the inclined guide face, it is possible to easily insert the tip end of the binding band which has been U-turned into the other of the two through holes even in case of groping work by hand. It is needless to say that in case where the inner side wall faces of not only the upper inlet of the other through hole but the respective upper inlets of the two through holes are formed on the substantially same conditions, the same effects can be achieved whichever of the through holes the binding band may be first passed through.

According to the electric junction box having the structure as described above in (2), the outer side wall face of the upper inlet of at least the other of the two through holes is formed as the inclined face for guiding the tip end of the binding band into at least the other of the two through holes. Therefore, the tip end of the binding band can be more easily inserted into at least the other of the two through holes. In this case too, it is needless to say that in case where the inner side wall faces of not only the upper inlet of the other through hole but the respective upper inlets of the two through holes are formed on the substantially same conditions, the same effects can be achieved whichever of the through holes the binding band may be first passed through.

According to the electric junction box having the structure as described above in (3), because the lower face of the bottom wall between the two through holes is formed as the concave curved face, the wire harness can be so arranged as to be received within the concave curved face, and it is possible to secure the wire harness stably without occurring a lateral deviation.

According to the electric junction box having the structure as described above in (4), the bottom wall between the two through holes is formed as the arc-shaped wall, whereby the convex arc-shaped face and the concave arc-shaped face are formed on the upper face and the lower face. Therefore, the structure is simple and can be easily designed, and in addition, improved molding performance can be obtained, when the electric junction box is molded of resin.

According to the invention, it is possible to easily pass the tip end of the binding band through the through holes even in case of groping work by hand, whereby it is possible to facilitate the securing work of the wire harness.

The invention has been briefly described hereinabove. Details of the invention will be further clarified, by reading the best mode for carrying out the invention which will be described below, referring to the attached drawings.

DETAILED DESCRIPTION OF THE PREFERRED EMBODIMENTS

Figure 1:
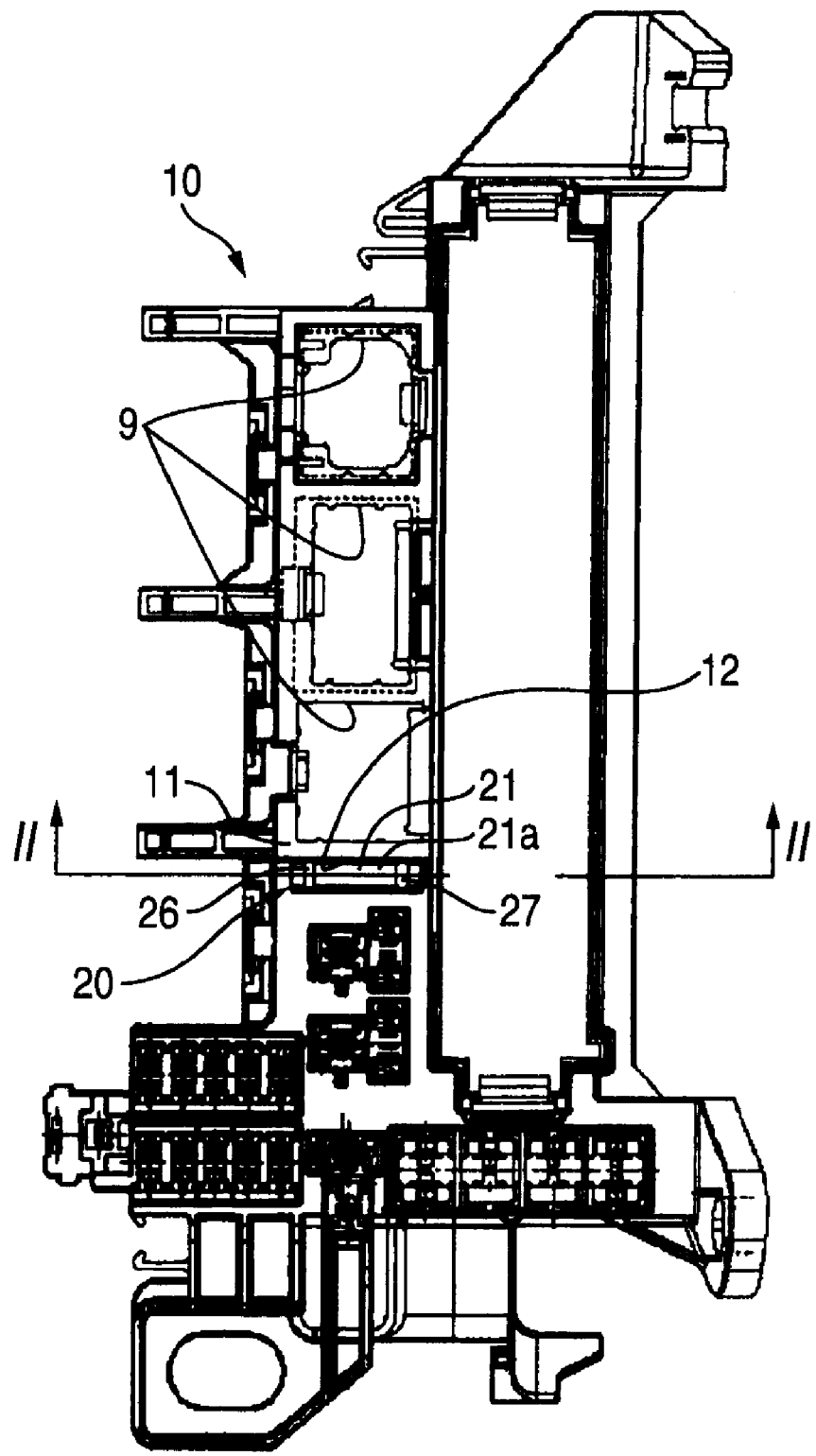
FIG. 1 is a top view of an electric junction box in an embodiment according to the invention.

Now, a preferred embodiment of the invention will be described in detail, referring to the drawings.

Figure 2:
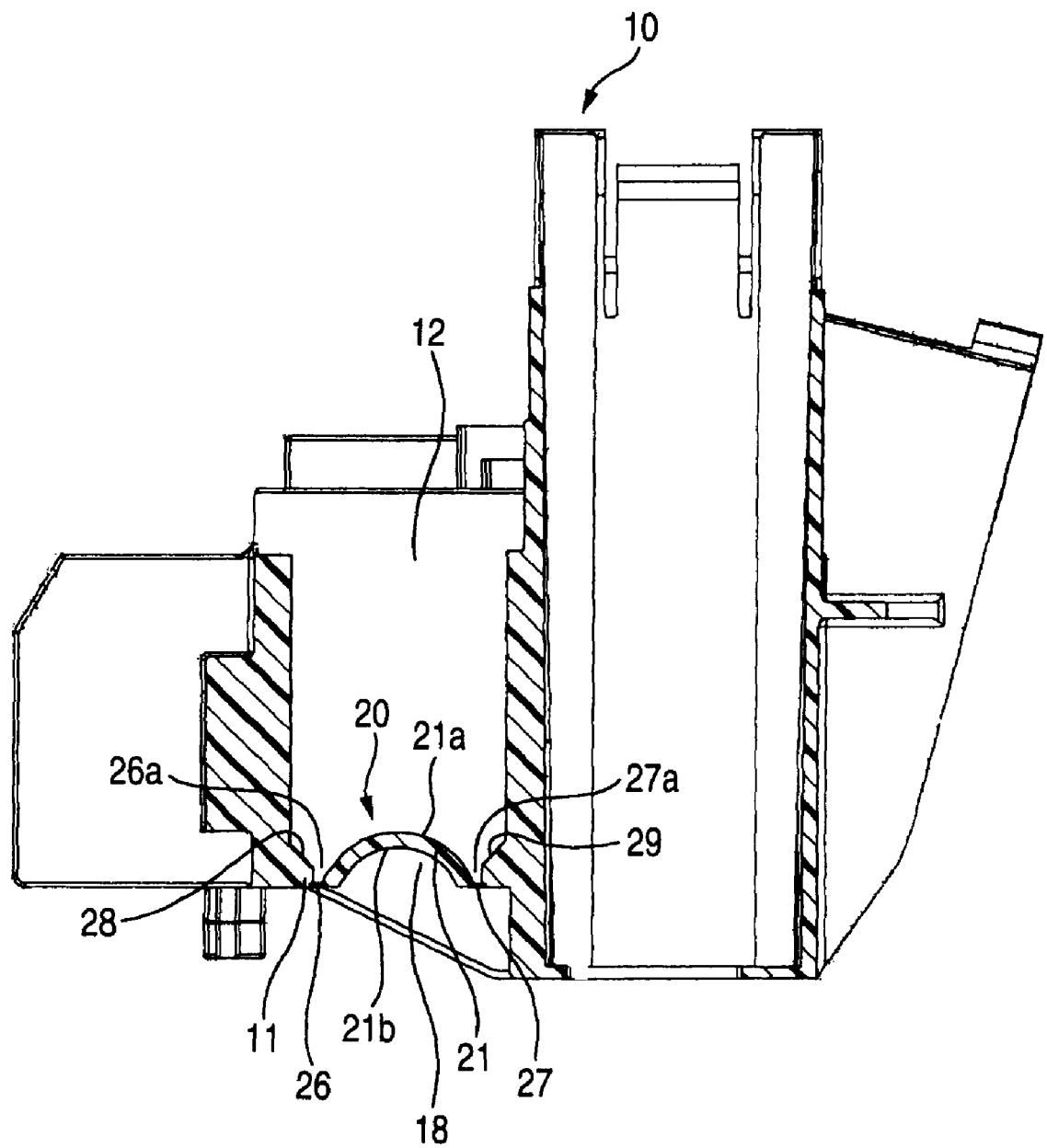
FIG. 2 is a sectional view as seen in a direction of arrows II-II in FIG. 1.
Figure 3:
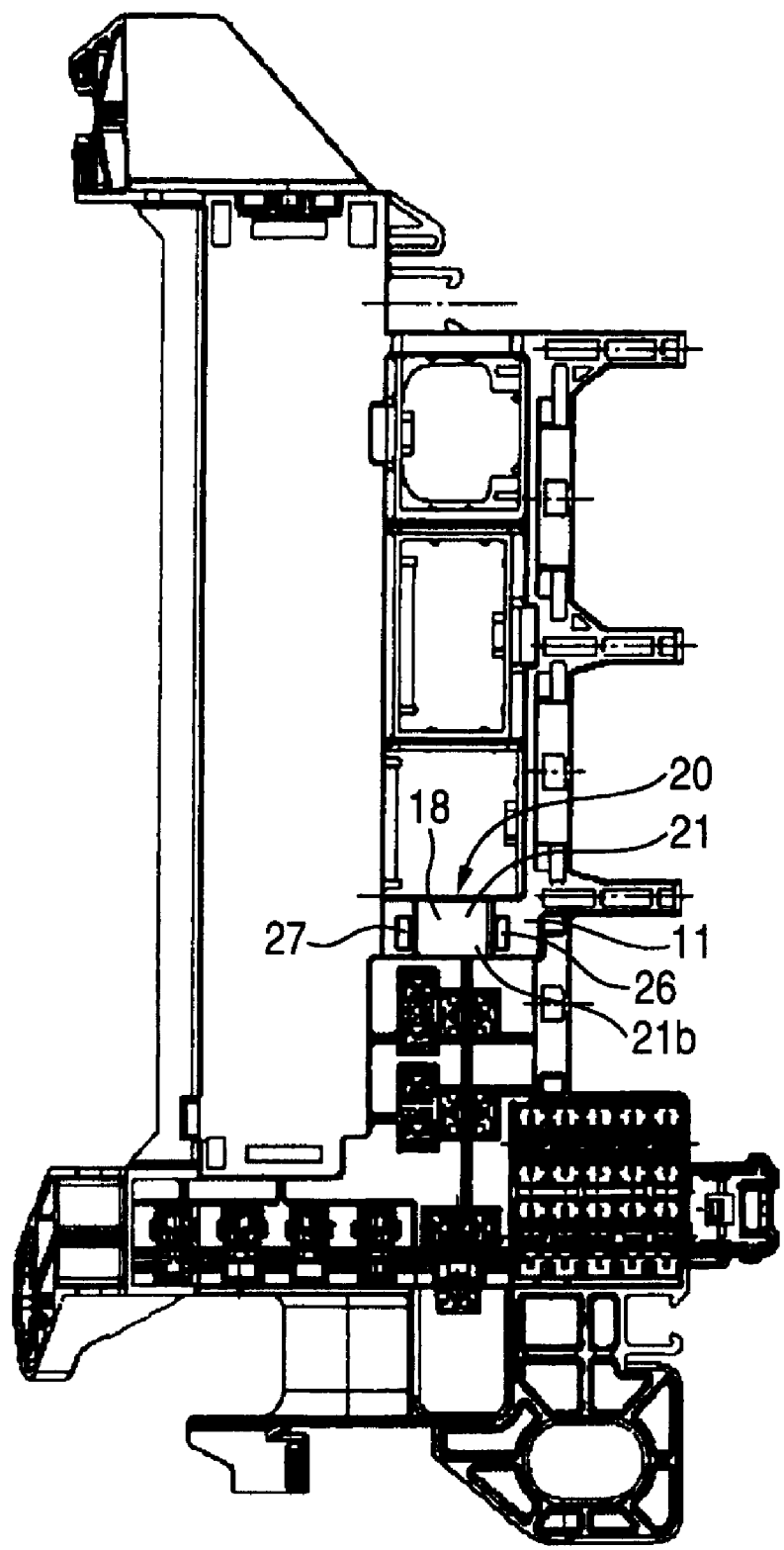
FIG. 3 is a bottom view of the electric junction box in FIG. 1.
Figure 4:
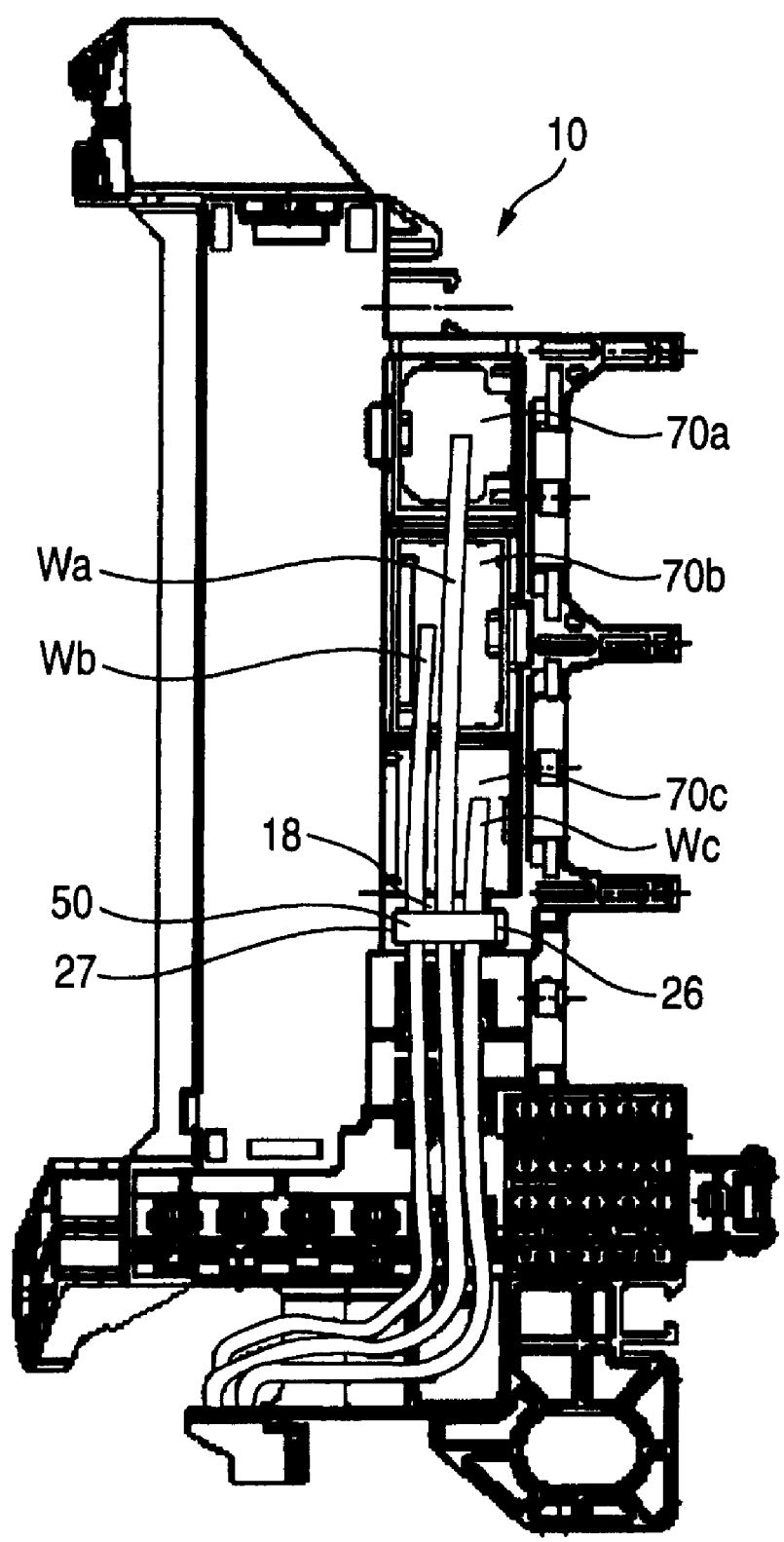
FIG. 4 is a bottom view of the electric junction box in a state where wire harnesses are secured with a binding band.
Figure 5:
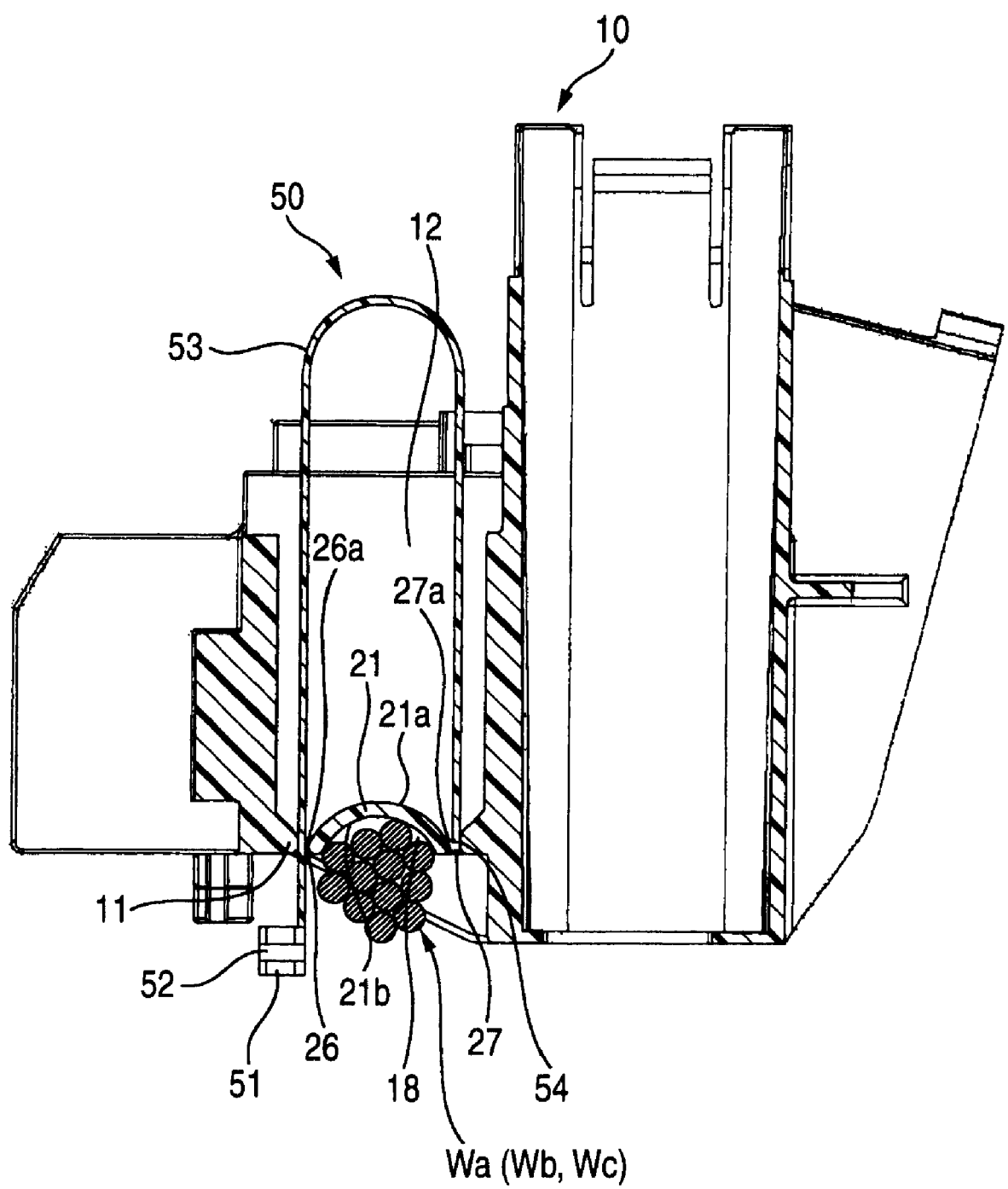
FIG. 5 is a view similar to FIG. 2, showing a manner of inserting the binding band into through holes.

FIG. 1 is a top view of an electric junction box in the embodiment, FIG. 2 is a sectional view as seen in a direction of arrows II-II in FIG. 1, FIG. 3 is a bottom view of the electric junction box, FIG. 4 is a bottom view of the electric junction box in a state where wire harnesses are secured with a binding band, and FIG. 5 is a view similar to FIG. 2, showing a manner of inserting the binding band into through holes. Although in this specification, the top and the bottom of the electric junction box are defined as described above, for enabling positions and directions to be easily grasped, it is needless to say that the top and the bottom can be defined contrarily. For example, FIG. 1 may be defined as a bottom view of the electric junction box in this embodiment, and FIG. 3 may be defined as a top view of the electric junction box.

As shown in FIGS. 1, 2 and 3, an electric junction box 10 has a bottom wall 11 at a lower position in a direction of height. In the electric junction box 10, containing holes 9 for containing components such as connectors and a binding band fitting hole 12 are provided, in parallel with each other, on the bottom wall 11 which serves as a common bottom wall. Because the connectors have a large size in height, the containing holes 9 and the binding band fitting hole 12 have also a large depth.

As shown in FIG. 4, wire harnesses Wa, Wb, and Wc are respectively withdrawn from lower parts of connectors 70a, 70b, 70c which are contained in the containing holes 9, and an arranging path 18 for arranging the wire harnesses Wa, Wb, Wc along a lower face of the bottom wall 11 is provided on the lower face of the bottom wall 11.

The bottom wall 11 of the binding band fitting hole 12 is provided with a fixing part 20 for fixing a binding band 50 for securing the wire harnesses Wa, Wb, Wc which are arranged along the lower face of the bottom wall 11. Two through holes 26 and 27 through which the binding band 50 is to be passed are formed in the fixing part 20 for the binding band 50 so as to be positioned at both sides of the arranging path 18 of the wire harnesses Wa, Wb, Wc.

Moreover, a part of the bottom wall 11 positioned between the two through holes 26, 27 is formed as an arc-shaped wall 21 in a shape of an arch (in other words, in a shape of a humpback bridge) which is curved upward in a convex shape in a direction substantially perpendicular to the bottom wall 11 including the two through holes 26, 27. In this manner, an upper face of the bottom wall 11 between the two through holes 26, 27 is formed as a convex arc-shaped face (a convex curved face) 21a, and a lower face thereof is formed as a concave arc-shaped face (a concave curved face) 21b. As the results, inner side wall faces of inlets 26a, 27a at upper sides of the respective through holes 26, 27 are formed as inclined guide faces for guiding a tip end 54 of a band 53 of the binding band 50 into the through holes 26, 27. Further, outer side wall faces of the inlets 26a, 27a at the upper sides of the respective through holes 26, 27 are also formed as inclined faces 28, 29 for guiding the tip end 54 of the band 53 of the binding band 50 into the through holes 26, 27.

Then, operation will be described. In case where the wire harnesses Wa, Wb, Wc which are arranged along the arranging path 18 on the lower face of the bottom wall 11 of the binding band fitting hole 12 are secured to the bottom wall 11, as a first step, the tip end 54 of the band 53 of the binding band 50 is inserted into one of the through holes 26 from a lower side of the bottom wall 11, and thereafter, the tip end 54 of the band 53 which has been exposed to an upper side of the bottom wall 11 is U-turned in a downward direction to be inserted into the other through hole 27.

On this occasion, because the part of the bottom wall 11 between the two throughholes 26, 27 is formed as the arc-shaped wall 21, the upper face of the arc-shaped wall 21 is formed as the convex arc-shaped face 21a, whereby the inner side wall faces of the inlets 26a, 27a at the upper sides of the through holes 26, 27 are formed as the inclined guide faces. Therefore, even in case of groping work by hand, the tip end 54 of the band 53 which has been U-turned can be easily inserted into the other through hole 27 by guiding action of the inclined guide face. In this case, because the upper inlets 26a, 27a of the two through holes 26, 27 are formed on the substantially same conditions, the same effects can be achieved whichever of the through holes 26, 27 the binding band 50 may be first passed through.

Then, the tip end 54 of the band 53 which has been exposed to the lower side of the bottom wall 11 after making the U-turn is passed through a locking hole 52 in a lock part 51 which is provided at a base end of the band 53, and locked thereto below the wire harnesses Wa, Wb, Wc. In this manner, the wire harnesses Wa, Wb, Wc can be secured to the lower face of the bottom wall 11.

In this case, because the outer side wall faces of the inlets 26a, 27a at the upper sides of the respective through holes 26, 27 are also formed as the inclined faces 28, 29, the tip end 54 of the band 53 of the binding band 50 can be more easily inserted.

Moreover, because the lower face of the bottom wall 11 between the two through holes 26, 27 (the arc-shaped wall 21) is formed as the concave curved face (the concave arc-shaped face 21b), the wire harnesses Wa, Wb, Wc can be so arranged as to be received within the concave curved face, and hence, it is possible to secure the wire harnesses Wa, Wb, Wc stably without occurring a lateral deviation.

Further, in the electric junction box in this embodiment, because the part of the bottom wall 11 between the two through holes 26, 27 is formed as the arc-shaped wall 21, the convex curved face (the convex arc-shaped face 21a) is formed on the upper face and the concave curved face (the concave arc-shaped face 21b) is formed on the lower face. Therefore, the structure is simple and can be easily designed, and in addition, improved molding performance can be obtained, when the electric junction box 10 is molded of resin.

It is to be noted that the invention is not limited to the above described embodiment, but various modifications, improvements, and so on can be appropriately made. Further, materials, shapes, sizes, numbers, positions to be arranged, and so on of the components in the above described embodiment are not limited, but can be optionally selected, provided that the invention can be accomplished with the components.

Figure 6:
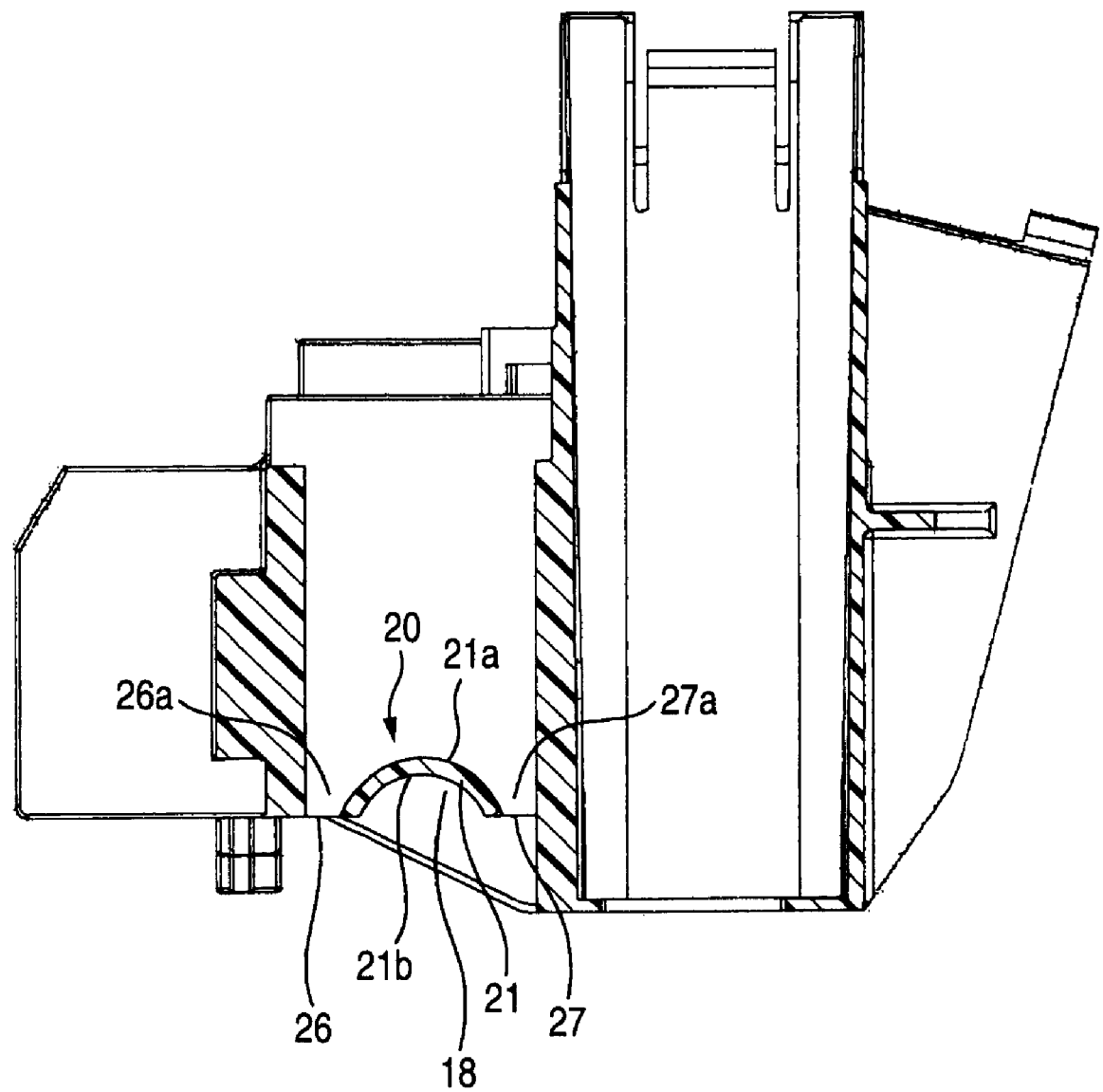
FIG. 6 is a view similar to FIG. 2, showing an electric junction box in another embodiment.

For example, as seen in an electric junction box in another embodiment as shown in FIG. 6, the inclined faces 28, 29 which are opposed to each other, interposing the arc-shaped wall 21 and the through holes 26, 27 (See FIG. 2), may be omitted.

Moreover, although in the above described embodiment, the part of the bottom wall 11 between the two through holes 26, 27 is formed as the arc-shaped wall 21, the lower face of the bottom wall 11 need not be the concave curved face, but may be formed as a flat face.

Further, it would be sufficient that the upper face of the part of the bottom wall 11 between the two through holes 26, 27 is formed as the convex curved face having a smooth curve, but need not be necessarily formed as an arc-shaped face.

What is claimed is:

1. An electric junction box comprising:
    a binding band fitting hole, two through holes through which a binding band for securing a wire harness which is arranged along a lower face of a bottom wall of said binding band fitting hole being provided on said bottom wall so as to be positioned at both sides of the wire harness,
    wherein when said wire harness is secured, a tip end of said binding band is inserted into one of said two through holes from a lower side of said bottom wall, the tip end of said binding band which has been exposed to an upper side of said bottom wall is U-turned in a downward direction, and inserted into the other of said two through holes, and then, the tip end of said binding band which has been exposed to the lower side of said bottom wall is locked to a lock part provided at a base end of said binding band below said wire harness, thereby to secure said wire harness to the lower face of said bottom wall,
    wherein an upper face of said bottom wall between said two through holes is formed as a convex curved face which is curved in a convex shape in a direction substantially perpendicular to said bottom wall including said two through holes, whereby an inner side wall face of an upper inlet of at least the other of said two through holes is formed as an inclined guide face for guiding the tip end of said binding band into at least the other of said two through holes.

2. An electric junction box as claimed in claim 1, wherein an outer side wall face of the upper inlet of at least the other of said two through holes is formed as an inclined face for guiding the tip end of said binding band into at least the other of said two through holes.

3. An electric junction box as claimed in claim 1, wherein the lower face of said bottom wall between said two through holes is formed as a concave curved face which is curved in a concave shape in a direction substantially perpendicular to said bottom wall including the two through holes.

4. An electric junction box as claimed in claim 3, wherein said bottom wall between said two through holes is formed as an arc-shaped wall which is curved in a convex shape upward in a direction substantially perpendicular to said bottom wall including the two through holes, whereby the upper face of said bottom wall between said two through holes is formed as a convex arc-shaped face and the lower face of said bottom wall between said two through holes is formed as a concave arc-shaped face.

* * * * *